(12) United States Patent
Nettleton

(10) Patent No.: US 12,321,896 B1
(45) Date of Patent: Jun. 3, 2025

(54) ELECTRONIC SIGNATURE SYSTEM AND METHOD

(71) Applicant: David Nettleton, Roseville, CA (US)

(72) Inventor: David Nettleton, Roseville, CA (US)

( * ) Notice: Subject to any disclaimer, the term of this patent is extended or adjusted under 35 U.S.C. 154(b) by 736 days.

(21) Appl. No.: 17/708,641

(22) Filed: Mar. 30, 2022

Related U.S. Application Data

(60) Provisional application No. 63/214,637, filed on Jun. 24, 2021.

(51) Int. Cl.
| | | |
|---|---|---|
| *G06Q 10/00* | (2023.01) | |
| *G06Q 10/10* | (2023.01) | |
| *G06Q 20/02* | (2012.01) | |
| *G06Q 20/38* | (2012.01) | |

(52) U.S. Cl.
CPC .......... *G06Q 10/103* (2013.01); *G06Q 20/02* (2013.01); *G06Q 20/3827* (2013.01)

(58) Field of Classification Search
CPC ... G06Q 10/103; G06Q 20/02; G06Q 20/3827
See application file for complete search history.

(56) References Cited

U.S. PATENT DOCUMENTS

| | | | |
|---|---|---|---|
| 7,934,098 B1 | 4/2011 | Hahn et al. | |
| 8,868,916 B2 | 10/2014 | Shapiro | |
| 9,268,969 B2 | 2/2016 | Gault et al. | |
| 9,698,992 B2 | 7/2017 | Gertner | |
| 9,842,201 B2 | 12/2017 | Follis et al. | |
| 9,984,242 B2 | 5/2018 | Follis | |
| 10,361,871 B2 | 7/2019 | Saxena et al. | |
| 10,841,439 B2 | 11/2020 | Gonser et al. | |
| 2014/0365765 A1* | 12/2014 | Oswalt | H04L 9/083 713/156 |
| 2014/0379585 A1* | 12/2014 | Buelloni | G06Q 20/02 705/76 |
| 2017/0103065 A1 | 4/2017 | Coyne | |
| 2017/0270320 A1 | 9/2017 | Petrogiannis et al. | |
| 2022/0191044 A1* | 6/2022 | Kurita | H04L 9/3263 |

OTHER PUBLICATIONS

"Creating an E-Signature Template" retrieved from the Internet Archive at https://web.archive.org/web/20210413234546/https://www.contractworks.com/help/creating-an-e-signature-template (Year: 2021).*

Prudue University DocuSign: Routing a Document for Signature via a URL retrieved at https://it.purdue.edu/images/services/docusign---routing-a-document-for-signature-via-url.pdf; last updated Aug. 22, 2016 (Year: 2016).*

* cited by examiner

*Primary Examiner* — Gabrielle A McCormick
(74) *Attorney, Agent, or Firm* — John Rizvi; John Rizvi, P.A.—The Patent Professor ®

(57) ABSTRACT

A system and method that provides for the secure execution of any electronic document through the linkage of authenticated electronic signature(s) without modifying or storing the original electronic document to be executed. As such, users may approve, decline, acknowledge, consent, certify and/or electronically execute any electronic document in a fully secure fashion and in compliance with applicable electronic signature laws.

20 Claims, 12 Drawing Sheets

| Document Status | Description |
|---|---|
| Pending | An Initial State Set By The Utility Application |
| Rejected | Set By The Utility Application: If The Singer Rejects<br>Set By The Router: If The Option To Have The Router Complete The Document Was Set During The Routing Process, Then The Router Can Reject The Final Document |
| Fully Approved | Set By The Utility Application: Once All E-Signatures Are Obtained<br>Set By The Router: If The Option To Have The Router Complete The Document Was Set During The Routing Process, Then The Router Can Fully Approve The Final Document |

FIG. 11

ELECTRONIC SIGNATURE SYSTEM AND METHOD

CROSS-REFERENCE TO RELATED APPLICATION

This application claims the benefit of U.S. Provisional Application 63/214,637, filed Jun. 24, 2021, which is hereby incorporated by reference herein in its entirety.

FIELD OF THE INVENTION

The present invention relates generally to document management systems, and more particularly, to a system and method that facilitate the electronic execution of documents with authenticated electronic signatures.

BACKGROUND OF THE INVENTION

The COVID-19 pandemic has fundamentally altered the way we live and conduct business. For significant periods of time, and under governmental health orders, non-essential businesses closed their offices and established entirely remote workforces, and many individuals were subject to quarantine conditions, which means, among other things, that obtaining "wet" signatures on paper documents (e.g., contracts) became highly inconvenient and sometimes impossible. This reality focused more attention on electronic formats and supporting electronic document management systems. Electronic signatures apply to both agreements entered into online, such as when completing an Internet-based transaction or assenting to a contract via email, as well as paper documents.

An electronic signature, or so-called e-signature, generally refers to an electronically born manifestation of a person's signature or mark that indicates that the person has assented to the contents of a digital document or in some cases that the person has prepared the digital document. An e-signature can be represented as stylized script that appears to have been written by hand, and when a digital document that has been executed using an e-signature is printed or displayed, the stylized script of the e-signature appears in the appropriate location in that document. Such e-signatures are generally accepted and recognized as a legal signature in the same fashion as an ink-based hand-written signature.

Generally, electronic signatures have the same effect as paper and ink signatures throughout the United States. The U.S. generally has two sources of law that govern the legal effect of electronic signatures: the State Uniform Electronic Transactions Act ("UETA") and the Federal Electronic Signatures in Global and National Commerce Act ("E-SIGN"). E-SIGN has many of the same rules as UETA. The guiding principles of both laws is that absent exceptions, when parties to a contract have agreed to use an electronic signature, a signature "may not be denied legal effect . . . solely because it is in electronic form", and "a contract may not be denied legal effect or enforceability solely because an electronic record was used in its formation." UETA was passed to remove obstacles to electronic transactions by setting an expansive view of what constitutes electronic records and signatures. Having been adopted by 48 states and the District of Columbia (Illinois and New York are the exceptions), UETA is the law for most jurisdictions across the U S instituting and governing electronic signatures E-SIGN preempts a State's law on electronic transactions unless the State has adopted UETA or rules consistent with E-SIGN. In States that have adopted UETA. E-SIGN governs only to the extent the State's version is inconsistent with E-SIGN UETA distinguishes between electronic signatures and digital signatures. The core difference between electronic signatures and digital signatures is that an electronic signature is a legal concept adopted by a person with the intent to sign a record, while a digital signature is an encryption/decryption technology that secures the data associated with an electronic signature to associate the data with a certain person and help verify the authenticity of the signature later. For example, Adobe Sign and DocuSign® are two examples of commercially available digital signature platforms. The UETA explicitly notes that it is not a digital signature statute, and certain States, such as California, have separate regulations/statutes governing digital signatures. The UETA also notes that, "[t]o the extent that a State has a Digital Signature Law, the UETA is designed to support and compliment that statute." Digital signatures will suffice where electronic signatures are necessary, however, the opposite may not be true if the added security afforded by digital signatures is required (e.g., by local State law). When parties are in doubt, they will first check whether any relevant State law speaks to the issue, and second, opt for digital signatures available through such commercially available platforms.

Similarly, Title 21 CFR Part 11 is the part of Title 21 of the Code of Federal Regulations that establishes the United States Food and Drug Administration (FDA) regulations on electronic records and electronic signatures. Pan 11, as it is commonly called, defines the criteria under which electronic records and electronic signatures are considered trustworthy, reliable, and equivalent to paper records and signatures. Practically speaking, Part 11 applies to drug makers, medical device manufacturers, biotech companies, biologics developers, and other FDA-regulated industries, with some specific exceptions. These regulations require that these parties implement controls, including audits, system validations, audit trails, electronic signatures, and documentation for software and systems involved in processing the electronic data In short, Part 11 sets out how a company operating in the U.S. can use electronic quality records and electronic signatures in place of paper-based documentation and 'wet signatures' in such a way that complies with the applicable FDA regulations.

Without a doubt, the emergence and more pervasive use of electronic signatures has generally demonstrated major conveniences and may, in some cases, eliminate the need for paper-based "wet" signature procedures altogether. However, current electronic signature solutions may not be secure because they may rely on a transfer of the documents as-a-whole. Some solutions include getting a signature or signature mark on a portable document format (PDF) document and transferring a signed document to other parties for their subsequent and final execution. However, documents which require a signature may have substantially important delivery requirements, which may not be met according to current electronic signature solutions. Presently, there are several different ways or systems to provide an electronic signature or authorization, such as email and third-party signature verification applications, such as HelloSign, SignNow, DocuSign and Adobe Sign.

However, despite their advantages these available systems do have select drawbacks and limitations. For example, email-based document signature systems are susceptible to "e-mail hacking" that may compromise the security or integrity of the signed document. For example, someone who has hacked the email of a party to the document may sign the document in place of the actual person who was intended to sign the documents. Other third-party signature verification applications rely on a third-party to ensure the security and integrity of signed documents. For example, users register their identities with an electronic signature company, generate contracts to sign, and sign those contracts. Electronic signature companies keep a record of the document and signatures that can be later retrieved to verify which documents were signed and by whom. Unfortunately, these electronic signature companies are also susceptible to potential hacking from external bad actors and to errors by persons who manage the electronic signature companies' systems.

Accordingly, there is need for a technique that provides improved security for the execution of documents with electronic signatures.

SUMMARY OF THE INVENTION

The present invention is directed to a system and method that provides for the secure execution of any electronic document through the linkage of authenticated electronic signatures without modifying or storing the original electronic document. As such, users may approve, decline, acknowledge, consent, certify and/or electronically execute any electronic document in a fully secure fashion and in compliance with applicable electronic signature laws.

In a first implementation of the invention, an electronic signature utility system is provided for electronically signing an electronic document. The electronic utility system comprising at least: a processor, a database, and a memory storing instructions that when executed cause the processor to execute operations comprising: (i) receiving, from a routing party, a first copy of the electronic document and a routing process specific to the electronically signing the electronic document, the routing process defining details associated with the electronically signing of the electronic document comprising at least a signing party listing and a statement of testament; (ii) establishing, using the first copy of the electronic document received, a security identification code specific to the electronic document, and the first copy of the electronic document and for all respective other copies of the electronic document in the possession of each respective signing party of the signing party listing; (iii) storing, in the database, the security identification code established but not the first copy of the electronic document received or any one of the respective other copies of the electronic document in possession of each respective party of the signing party listing; (iv) for each respective signing party of the signing party listing: (a) sending a notification inviting the respective signing party to join the routing process by providing, to the electronic signature utility system, the respective signing party's copy of the electronic document; (b) receiving, from the respective signing party, the respective signing party's copy of the electronic document, (c) comparing the respective security identification code associated with the respective signing party's copy of the electronic document received with the established security identification code stored to determine a match, and if matching, then proceeding with the routing process; (d) presenting the statement of testament to the respective signing party for confirming their acceptance or rejection to the electronically signing the electronic document, and receiving, from the respective signing party, a response to the statement of testament presented; (e) authenticating the respective signing party's identity; and (f) if the respective signing party's identity is authenticated, creating, using the response to the statement of testament presented, an electronic signature page with the respective signing party's electronic signature affixed thereto and linking the electronic signature page created with the electronic document, and storing, in the database, the electronic signature page linked thereto; and (v) upon completion of the electronically signing the electronic document by each respective signing party of the signing party listing, transmitting a notification to the routing party and each respective signing party of the signing party listing that the electronically signing the electronic document is complete.

In a second aspect, a method is provided for managing an electronic signature utility system and for electronically signing an electronic document comprising operations of: (i) receiving, from a routing party, a first copy of the electronic document and a routing process specific to the electronically signing the electronic document, the routing process defining details associated with the electronically signing of the electronic document comprising at least a signing party listing and a statement of testament; (ii) establishing, using the first copy of the electronic document received, a security identification code specific to the electronic document, and the first copy of the electronic document and for all respective other copies of the electronic document in the possession of each respective signing party of the signing party listing; (iii) storing, in the database, the security identification code established but not the first copy of the electronic document received or any one of the respective other copies of the electronic document in possession of each respective party of the signing party listing; (iv) for each respective signing party of the signing party listing: (a) sending a notification inviting the respective signing party to join the routing process by providing, to the electronic signature utility system, the respective signing party's copy of the electronic document; (b) receiving, from the respective signing party, the respective signing party's copy of the electronic document; (c) comparing the respective security identification code associated with the respective signing party's copy of the electronic document received with the established security identification code stored to determine a match, and if matching, then proceeding with the routing process, (d) presenting the statement of testament to the respective signing party for confirming their acceptance or rejection to the electronically signing the electronic document, and receiving, from the respective signing party, a response to the statement of testament presented; (e) authenticating the respective signing party's identity, and (f) if the respective signing party's identity is authenticated, creating, using the response to the statement of testament presented, an electronic signature page with the respective signing party's electronic signature affixed thereto and linking the electronic signature page created with the electronic document, and storing, in the database, the electronic signature page linked thereto; and (v) upon completion of the electronically signing the electronic document by each respective signing party of the signing party listing, transmitting a notification to the routing party and each respective signing party of the signing party listing that the electronically signing the electronic document is complete.

In a third aspect, an electronic signature utility system application (alternatively referred to herein as an "app") for executing, on a user device or other hardware, is provided for managing an electronic signature utility system and for electronically signing an electronic document, and comprising operations of: (i) receiving, from a routing party, a first copy of the electronic document and a routing process specific to the electronically signing the electronic document, the routing process defining details associated with the electronically signing of the electronic document comprising at least a signing party listing and a statement of testament; (ii) establishing, using the first copy of the electronic document received, a security identification code specific to the electronic document, and the first copy of the electronic document and for all respective other copies of the electronic document in the possession of each respective signing party of the signing party listing; (iii) storing, in the database, the security identification code established but not the first copy of the electronic document received or any one of the respective other copies of the electronic document in possession of each respective party of the signing party listing, (iv) for each respective signing party of the signing party listing: (a) sending a notification inviting the respective signing party to join the routing process by providing, to the electronic signature utility system, the respective signing party's copy of the electronic document; (b) receiving, from the respective signing party, the respective signing party's copy of the electronic document; (c) comparing the respective security identification code associated with the respective signing party's copy of the electronic document received with the established security identification code stored to determine a match, and if matching, then proceeding with the routing process; (d) presenting the statement of testament to the respective signing party for confirming their acceptance or rejection to the electronically signing the electronic document, and receiving, from the respective signing party, a response to the statement of testament presented; (e) authenticating the respective signing party's identity; and (f) if the respective signing party's identity is authenticated, creating, using the response to the statement of testament presented, an electronic signature page with the respective signing party's electronic signature affixed thereto and linking the electronic signature page created with the electronic document, and storing, in the database, the electronic signature page linked thereto; and (v) upon completion of the electronically signing the electronic document by each respective signing party of the signing party listing, transmitting a notification to the routing party and each respective signing party of the signing party listing that the electronically signing the electronic document is complete.

In a fourth aspect, the electronic signature utility app may be a mobile application executing on a mobile device and wherein the mobile device may be a smartphone, laptop computer, tablet and/or wearable device.

In a fifth aspect, the security identification code is a checksum.

In a sixth aspect, the electronic document is derived from any written document type.

In a seventh aspect, the electronic document is derived from any photograph type.

In eight aspect, the electronic document comprises and defines a musical composition.

In a ninth aspect, the statement of testament is customized to define a relationship between an electronic signature and the electronic document.

In a tenth aspect, the electronically executing the electronic document complies with at least one recognized electronic signature regulation.

In an eleventh aspect, the at least one recognized electronic signature regulation is Title 21 of the Code of Federal Regulations Part 11: Electronic Records and Signatures, issued 1997, and any revisions thereto.

In a twelfth aspect, the operations further comprise registering a plurality of parties for accessing the electronic signature utility system.

In a further aspect, the electronic document is a Portable Document Format (PDF) file.

In a further aspect, the operations further comprise calculating a checksum as the security identification code for associating with the electronic document.

In a further aspect, the execution routing process comprises a listing of multiple parties that need to execute the electronic document and a sequence for the execution.

In a further aspect the electronic document format has been converted from another file format.

In a further aspect, any and all copies of the final electronic document are deleted from temporary storage (e.g, the temporary storage of the electronic signature utility system) and no copies are retained or stored.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

FIG. 11 presents a flowchart of illustrative operations for the document status process of the electronic signature utility system of FIG. 2 in accordance with an embodiment.

Like reference numerals refer to like parts throughout the several views of the drawings.

DETAILED DESCRIPTION

Figure 1:
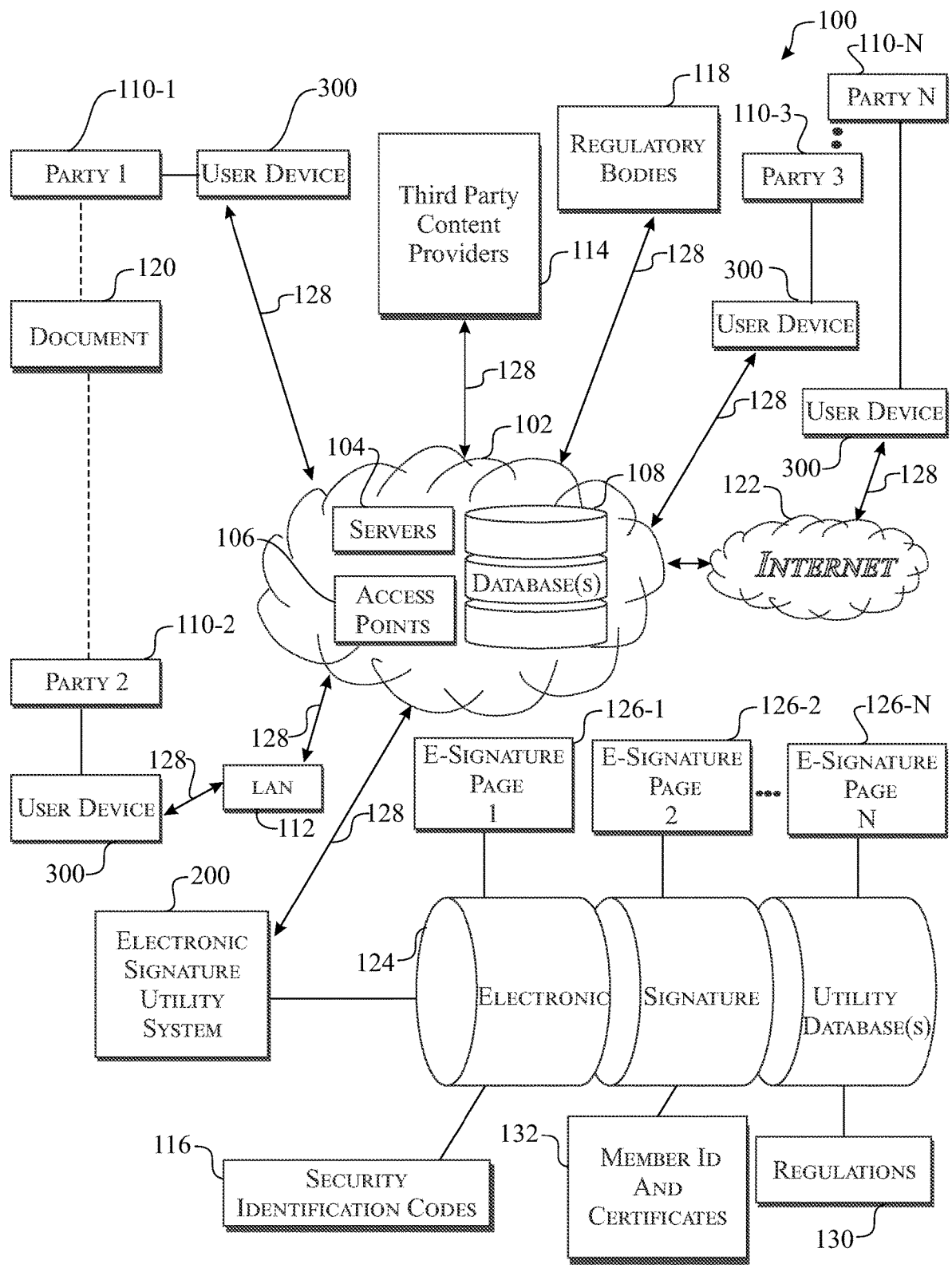
FIG. 1 presents a high-level block diagram of a cloud network services architecture for providing an electronic signature utility system in accordance with an embodiment.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in the figures herein. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a system and method that provides for the secure execution of any electronic document through the linkage of authenticated electronic signature(s) (also referred to herein as e-signature(s)) without modifying or storing the original electronic document. As such, users may approve, decline, acknowledge, consent, certify and/or electronically execute any electronic document or file of any type in a fully secure fashion and in compliance with applicable electronic signature laws. Importantly, the electronic signature utility system and method of the disclosed embodiments provide an advantageous improvement of at least one practical application. i.e., the execution and management of electronic documents in that the underlying document for execution is not retained in storage and/or not modified in any way. This solves a security problem and increases the security of the user's files in that such files remain private. This decreases the potential for third party hacking, for example, and risk to such user files. Importantly, in accordance with the principles of the disclosed embodiments, the electronic execution of an electronic document (e.g., a negotiated contract between two parties) is carried out without requiring the modification or storage, by the electronic signature utility system here under, of the underlying file and through the linkage of authenticated electronic signatures to the underlying file of the parties required to execute such file.

FIG. 1 presents a high-level block diagram of a cloud network services architecture 100 for providing an electronic signature utility in accordance with an embodiment. For clarity and the avoidance of doubt, it will be understood that the use of the term "party" herein means any type of party including, but not limited, an individual or entity that may be party to an executable file requiring their execution. Such parties are members (also alternatively referred to as "users") of the electronic signature utility system hereunder and have registered accordingly, as will be further detailed herein below. A member is designated as a "router" hereunder when such member initiates an electronic signature execution process for the electronic execution of a document (also referred to herein as a "route"). A "signer" hereunder is any party (e.g., a member) whose electronic signature is necessary to complete the electronic execution of a document in accordance with the principles of the disclosed embodiments. For avoidance of doubt, a router need not be a signer, but nothing precludes the router from also being a signer in accordance with the disclosed embodiments. Further, the use of the term "document" herein, whether in physical or electronic form depending on the context, shall mean any type of document, file, codicil, or other instrument that is associated with and requiring some type of signature.

As shown for instance in FIG. 1, the cloud network services architecture 100 includes a cloud 102 comprising at least server(s) 104, access point(s) 106 and database(s) 108. As will be detailed herein below, the cloud 102 facilitates the delivery of electronic signature utility system 200 to a plurality of parties (e.g., the plurality parties comprised by party 1 110-1, party 2 110-2, party 3 110-3 through party N 110-N), whereby the individual parties will play an important role in the overall document execution process. In an embodiment, the electronic signature utility and associated operations, offered by and through the cloud network services architecture 100 and the electronic signature utility system 200 will be facilitated by an electronic signature utility app 400 (see, FIG. 4), as will be detailed herein below, executing on a user device 300 (see, FIG. 3). The user device 300 provides parties (e.g., party 1 110-1 through party N 110-N) with real-time access to electronic signature utility services in accordance with the disclosed embodiments herein.

As noted above, the cloud 102 comprises at least server(s) 104, the access point(s) 106 and the database(s) 108. Cloud, cloud service, cloud server and cloud database are broad terms and are to be given their ordinary and customary meaning to one of ordinary skill in the art and includes, without limitation, any database, data repository or storage media which store content typically associated with and managed by users, electronic document management services, regulatory bodies, third party content providers, to name just a few. A cloud service may include one or more cloud servers and cloud databases that provides for the remote storage of content as hosted by a third-party service provider or operator. A cloud server may include an HTTP/HTTPS server sending and receiving messages in order to provide web-browsing interfaces to client web browsers as well as web services to send data to integrate with other interfaces (e.g., as executed on the user device 300). The cloud server may be implemented in one or more servers and may send and receive content in a various forms and formats, user supplied and/or created information/content and profile/configuration data that may be transferred to, read from or stored in a cloud database (e.g., the databases 108). The cloud 102 may also facilitate the use by third-party content providers 114, security identification codes 116, regulatory bodies 118, and other third parties in the course of the electronic execution services provided through the use of the electronic signature utility system 200.

A cloud database may include one or more physical servers, databases or storage devices as dictated by the cloud service's storage requirements. The cloud database may further include one or more well-known databases (e.g, an SQL database) or a fixed content storage system to store content, profile information, configuration information or administration information as necessary to execute the cloud service. In various embodiments, one or more networks providing computing infrastructure on behalf of one or more users may be referred to as a cloud, and resources may include, without limitation, data center resources, applications (e.g., software-as-a-service or platform-as-a-service)

and management tools. In this way, in accordance with various embodiments, the users may control, initiate, and engage in the electronic signature utility services herein in a fully transparent fashion without any required understanding of the underlying hardware and software necessary to interface, communicate, manipulate, and exchange information and/or data necessary to deliver such services.

Figure 2:
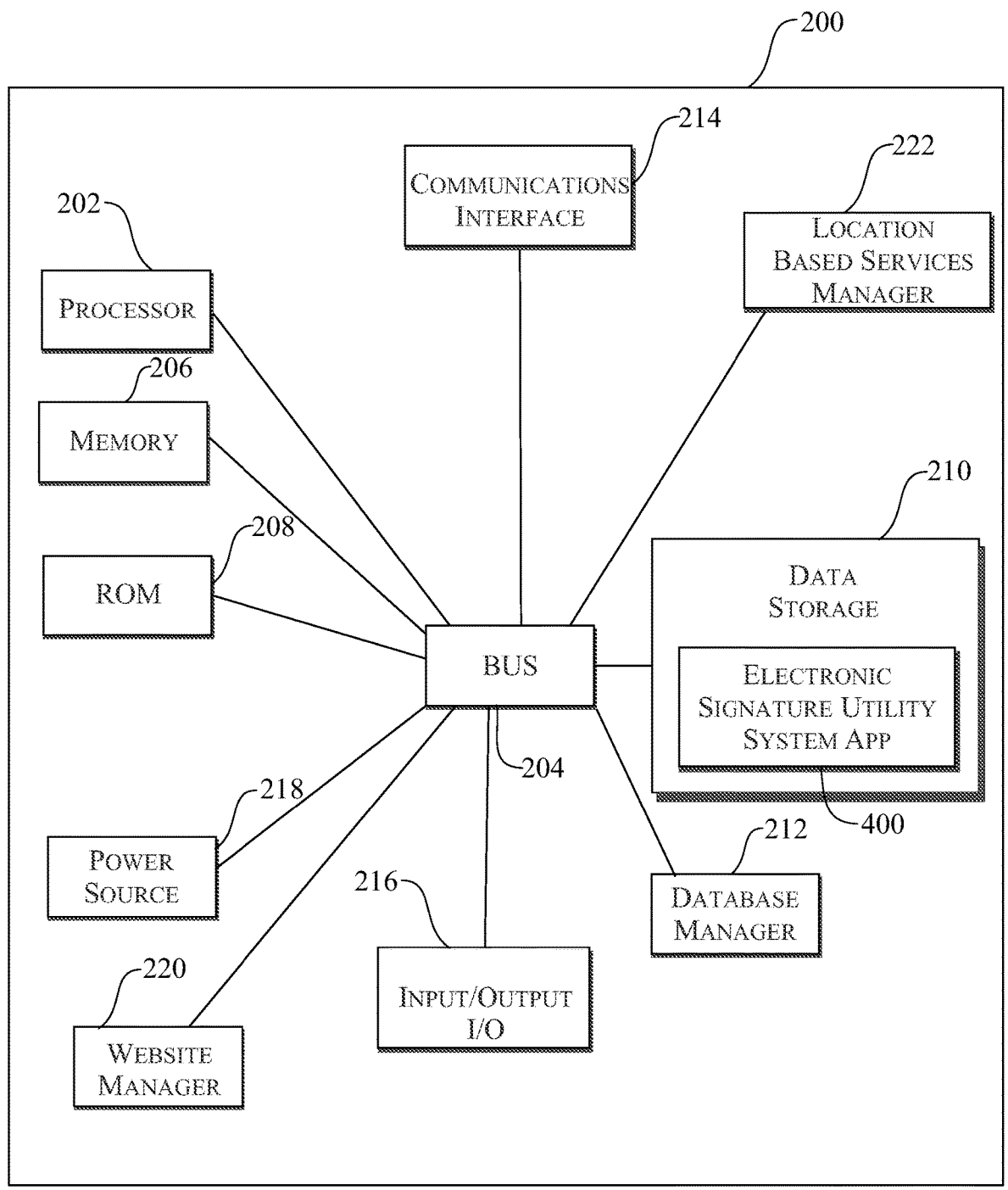
FIG. 2 presents an illustrative electronic signature utility system in accordance with an embodiment.

Turning our attention to FIG. 2, an illustrative configuration for the electronic signature utility system 200 is shown for deployment in the cloud network services architecture 100 in accordance with an embodiment. As shown, the electronic signature utility system 200 comprises processor 202 for executing program code (e.g., electronic signature utility system app 400) and communications interface 214 for managing communications to and from the electronic signature utility system 200, memory 206 and/or ROM 208 for storing program code and data, and power source 218 for powering the electronic signature utility system 200. The memory 206 is coupled to the bus 204 for storing computer-readable instructions to be executed by the processor 200 (e.g., execution of the electronic signature utility system app 400). Database manager 212 is used to manage the delivery and storage of content, data, and other information in the electronic signature utility database(s) 124, database(s) 108 and across third party content providers 114, for example. The electronic signature utility database(s) 124 may store and provide information including, but not limited, to electronic signature pages (e.g., electronic signature page 1 126-1, electronic signature page 2 126-2 through electronic signature page N 126-N), regulations 130, and member (or party) IDs and credentials 132. Similarly, website manager 220 is used to deliver and manage content, data, and other information across one or more websites that may be utilized to access and use the electronic signature utility system 200, for example. Further, the operations provided by and through the electronic signature utility system app 400 may be offered through a web-based application. As will be discussed in greater detail herein below, the electronic signature utility system app 400, as stored in data storage 210, when executed by the processor 202 will enable access by a plurality of parties (e.g., party 1 110-1 and party 2 110-1) to the electronic signature utility system 200 for the electronic execution of a specific document (e.g., document 120) that such parties have negotiated and are ready to finalize the execution thereof. Location-based service manager 222 facilitates the delivery of location-based services (e.g, GPS tracking) either independently or on user device 300 thereby allowing the electronic signature utility system 200 to register the exact location of the user of the user device 300, for example, as the user roams from one location to another location such that the services offered via the electronic signature utility may be tailored to a current location and/or the needs of the user/party may change based on their current location. For example, party 1 110-1 may be in a foreign jurisdiction that requires certain local regulations be adhered to.

Importantly, the electronic signature utility system 200 provides for the secure execution of any electronic document or file of any type through the linkage of authenticated electronic signatures without modifying or storing the original electronic document, and wherein such execution is fully compliant with applicable electronic signature laws, regulations, and the like. For example, the electronic signatures applied in accordance with the principles of the disclosed embodiments are fully compliant with Title 21 of the Code of Federal Regulations, Part 11, promulgated by the United States Food and Drug Administration (FDA) with respect to the use of electronic records and electronic signatures. As such, users may approve, decline, acknowledge, consent, certify and/or electronically execute any electronic document in a fully secure fashion and in compliance with these and other applicable electronic signature laws. In this way, the electronic signature utility system and method of the disclosed embodiments provides an advantageous improvement of at least one practical application, i.e., the execution and management of electronic documents. Significantly, in accordance with the principles of the disclosed embodiments, the electronic execution of a file (e.g., a negotiated contract between two parties) is carried out without requiring the modification or storage, by the electronic signature utility system here under, of the underlying file by and through the linkage of authenticated electronic signatures to the underlying file of the parties required to execute such file. That is, any and all copies of the final electronic document are deleted from temporary storage (e.g., the temporary storage of the electronic signature utility system 200) and no copies are retained or stored.

In an embodiment, the electronic signature utility services provided through the execution of the electronic signature utility system app 400 may also include a web-based delivery platform and/or accessing and interfacing any number of websites using website manager 220 for procuring information and data that can be used in the electronic signature utility system. The term "website" in the context herein is used in a conventional and broadest sense and is located on at least one server containing web pages stored thereon and is operational in a 24-hour/7-day typical fashion. Further, as shown in FIG. 1, the plurality of parties (i.e., party 1 110-1 through party N 110-N) may alternatively utilize well-known Internet 122 for access to electronic signature utility system 200 by and through a web browser on the user device 300, for example.

The communications interface 214 is used to facilitate communications across the communications links 128 (see, FIG. 1) within the cloud network services architecture 100 in a well understand fashion. This may take the form, for example, of a wide area network connection that communicatively couples the electronic signature utility system 200 with the access points 106 (see, FIG. 1) which may be a cellular communications service. Similarly, communications managed by the communications interface 214 may take the form, for example, of a local Wi-Fi network interface or Ethernet interface that communicatively couples the electronic signature utility system 200 with the Internet 122, LAN 112 and ultimately the user device 300. In the instant embodiment, the electronic signature utility system app 400 and/or the communications interface 214 may include a communications stack for facilitating communications over the respective communications link 128. Electronic communications by and through the electronic signature utility system 200 between the various systems, networks, devices, users, entities, and/or individuals are facilitated by the communications links 128 in accordance with any number of well-known communications protocols and methods (e.g., wireless communications).

Figure 3:
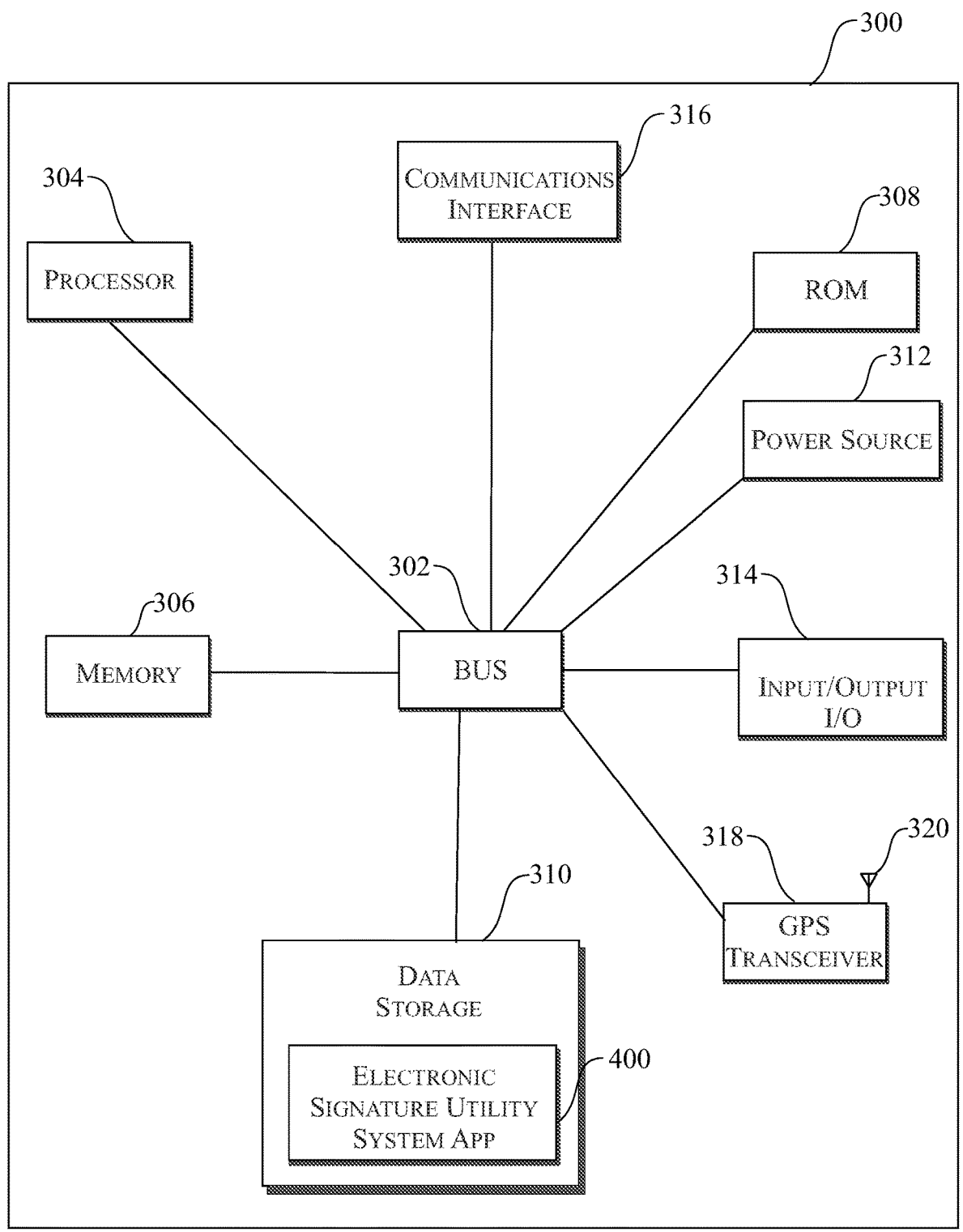
FIG. 3 presents an illustrative user device configured for use with the electronic signature utility system of FIG. 2 in accordance with an embodiment.

Turning our attention briefly to FIG. 3, an illustrative user device 300 is shown for deployment with the cloud network services architecture 100 of FIG. 1 in accordance with an embodiment. The user device 300 typically includes bus 302 and processor 304 coupled to the bus 302 for executing operations and processing information. As will be appreciated, a "user device" in the context herein may comprise a wide variety of devices such as any type of mobile device, smartphones, laptop computers, desktop computers, tablets, and wearable device, to name just a few, that execute applications (e.g., a mobile application) in accordance with the principles of the disclosed embodiments herein. For example, the execution of the operations of electronic signature utility system app 400 as will be discussed in much greater detail herein below. The processor 304, as powered by power source 312, may include both general and special purpose microprocessors, and may be the sole processor or one of multiple processors of the device. This is equally applicable to the processor 202 of FIG. 2. Further, the processor 304 (or the processor 202) may comprise one or more central processing units (CPUs) and may include, be supplemented by, or incorporated in, one or more application-specific integrated circuits (ASICs) and/or one or more field programmable gate arrays (FPGAs).

The user device 300 may also include memory 306 coupled to the bus 302 for storing computer-readable instructions to be executed by the processor 304. The memory 306 may also be utilized for storing temporary variables or other intermediate information during the execution of the instructions by the processor 304. The user device 300 may also include read-only memory (ROM) 308 or other static storage device coupled to the bus 302. Further, data storage device 310, such as a magnetic, optical, or solid-state device may be coupled to the bus 302 for storing information and instructions for the processor 304 including, but not limited to, the electronic signature utility system app 400. Data storage device 310 (or the data storage device 210) and the memory 306 (and the memory 206) may each comprise a tangible non-transitory computer readable storage medium and may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

The user device 300 may also include one or more communications interface 316 for communicating with other devices via a network (e.g., a wireless communications network) or communications protocol (e.g., Bluetooth®). For example, such communication interfaces may be a receiver, transceiver, or modem for exchanging wired or wireless communications in any number of well-known fashions. For example, the communications interface 316 (or the communications interface 214) may be an integrated services digital network (ISDN) card or modem/router used to facilitate data communications of various well-known types and formats. Further, illustratively, the communications interface 316 (or the communications interface 214) may be a local area network (LAN) card used to provide data communication connectivity to a comparable LAN. Wireless communication links may also be implemented. The Global Positioning System (GPS) transceiver 318 and antenna 320 facilitate delivery of location-based services in a well-known manner in order to register the exact location of the user device 300, for example, as the user roams from one location to another location.

As will be appreciated, the functionality of the communication interface 316 (or the communications interface 214) is to send and receive a variety of signals (e.g., electrical, optical, or other signals) that transmit data streams representing various data types. The user device 300 may also include one or more input/output devices 314 that enable user interaction with the user device 300 (e.g., camera, display, keyboard, mouse, speakers, microphone, buttons, etc.). The input/output devices 314 (or the I/O devices 216) may include peripherals, such as a camera, printer, scanner, display screen, etc. For example, the input/output devices 314 (or I/O devices 214) may include a display device such as a cathode ray tube (CRT), plasma monitor, liquid crystal display (LCD) monitor or organic light-emitting diode (OLED) monitor for displaying information to the user, a keyboard, and a pointing device such as a mouse or a trackball by which the user can provide input to the user device 300 or an associated display device, for example. As detailed herein, while FIG. 3 describes an embodiment of the electronic signature utility system app 400 for execution, illustratively, on the user device 300 it will also be understood that other hardware devices may be used to execute and operate the electronic signature utility system app 400 in any real-time setting including but not limited to the electronic signature utility system 200. For example, a network-enabled portable tablet computer and/or dedicated portable hardware device may be employed equally in the context of the disclosed embodiments.

Figure 4:
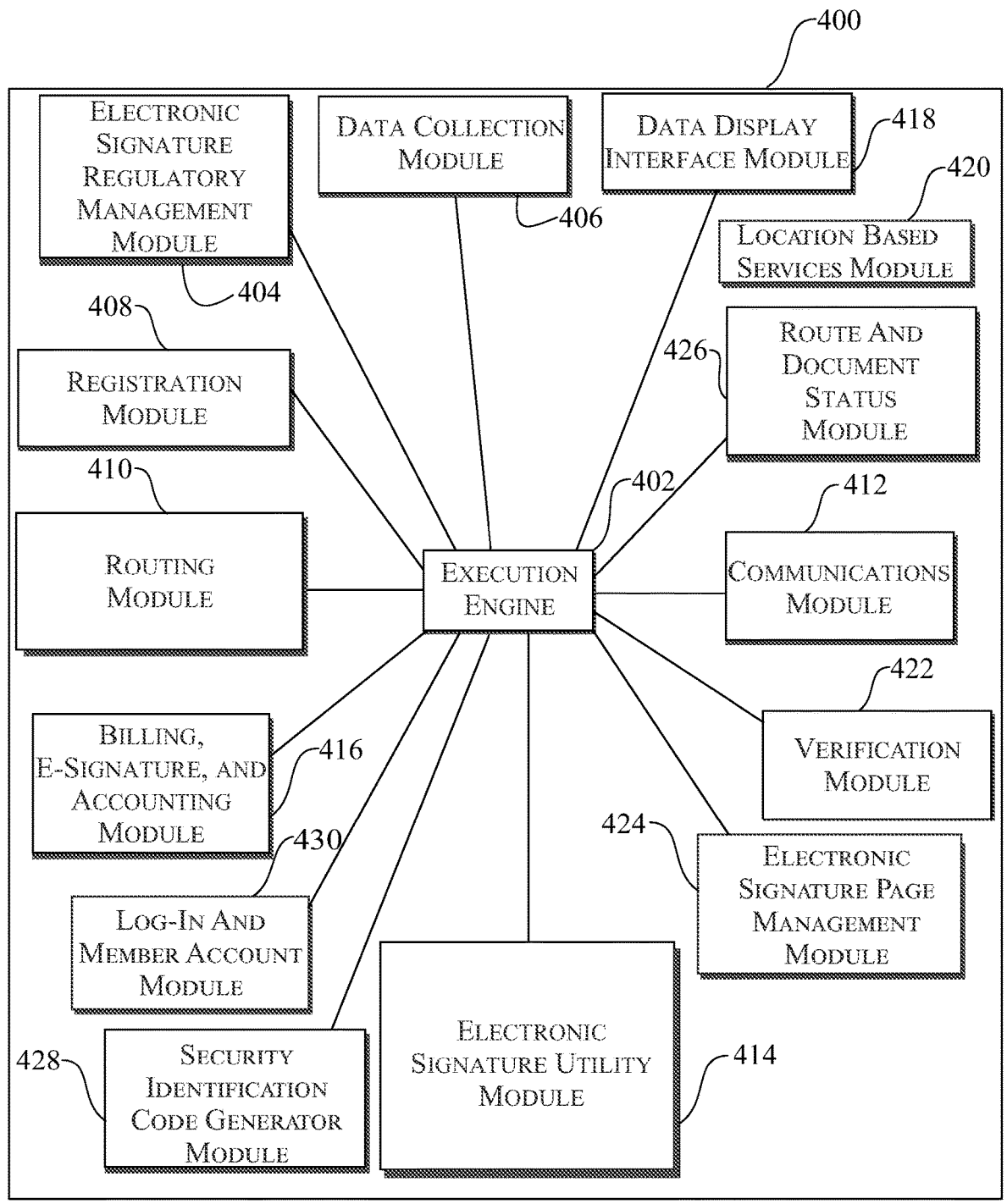
FIG. 4 presents an illustrative architecture for an electronic signature utility system app in accordance with an embodiment.

Turning our attention to FIG. 4, an illustrative architecture for the operation of the electronic signature utility system app 400 is presented in accordance with an embodiment. As will be appreciated, the architecture may be used in conjunction with the cloud network services architecture 100, the electronic signature utility system 200, and/or the user device 300 for launching and executing the electronic signature utility system app 400 and its associated operations. As shown, the architecture for the operations of the electronic signature utility system app 400 provides several interfaces and engines used to perform a variety of functions such as the collection, aggregation, manipulation, processing, analyzing, verification, authentication, and display of applicable real-time information and data that are useful to achieve the electronic signature utility services of the disclosed embodiments. More particularly, data display interface module 418 and communications module 412 are used to facilitate the input/output and display of electronic data and other information to, illustratively, the users (e.g., party 1 110-1 through party N 110-N) employing the user device 300 (e.g., a touch screen of the user device 300) and executing the electronic signature utility system app 400. The data collection module 406 facilitates the collection of electronic signature and other electronic document management information from the plurality of parties (i.e., party 1 110-1 through party N 110-N) and/or other third parties. The location-based services module 420 provides for the delivery of location-based services in order for the geographic locations of the parties to be identified and displayed (e.g., GPS locations). The communications module 412 will facilitate communications by and through the electronic signature utility system 200, for example.

Execution engine 402 may be employed to deliver the electronic signature utility services herein through the execution of the electronic signature utility system app 400. In such delivery, the execution engine 402 will operate and execute, as further detailed herein below, with at least the following program modules: electronic signature regulatory management module 404, data collection module 406, data display interface module 418, location-based services module 420, registration module 408, routing module 410, communications module 412, electronic signature utility module 414, billing, e-signature and accounting module 416, verification module 422, electronic signature page management module 424, route and document status module 426, security identification code generator module 428, and log-in and member account module 430.

Figure 5A:
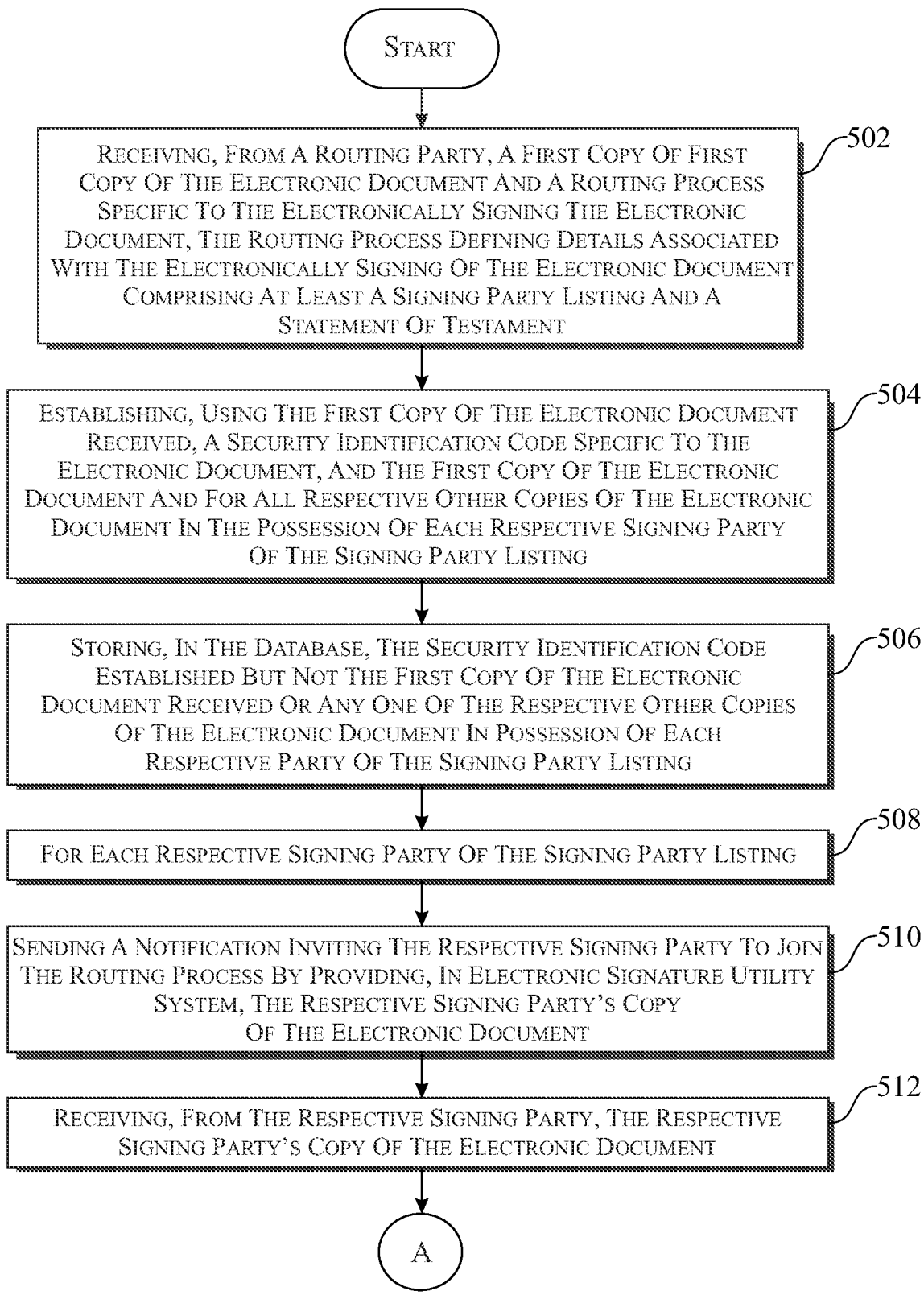
FIGS. 5A and 5B present a flowchart of illustrative operations for providing an electronic signature utility for use with the electronic signature utility system of FIG. 2 in accordance with an embodiment.
Figure 5B:
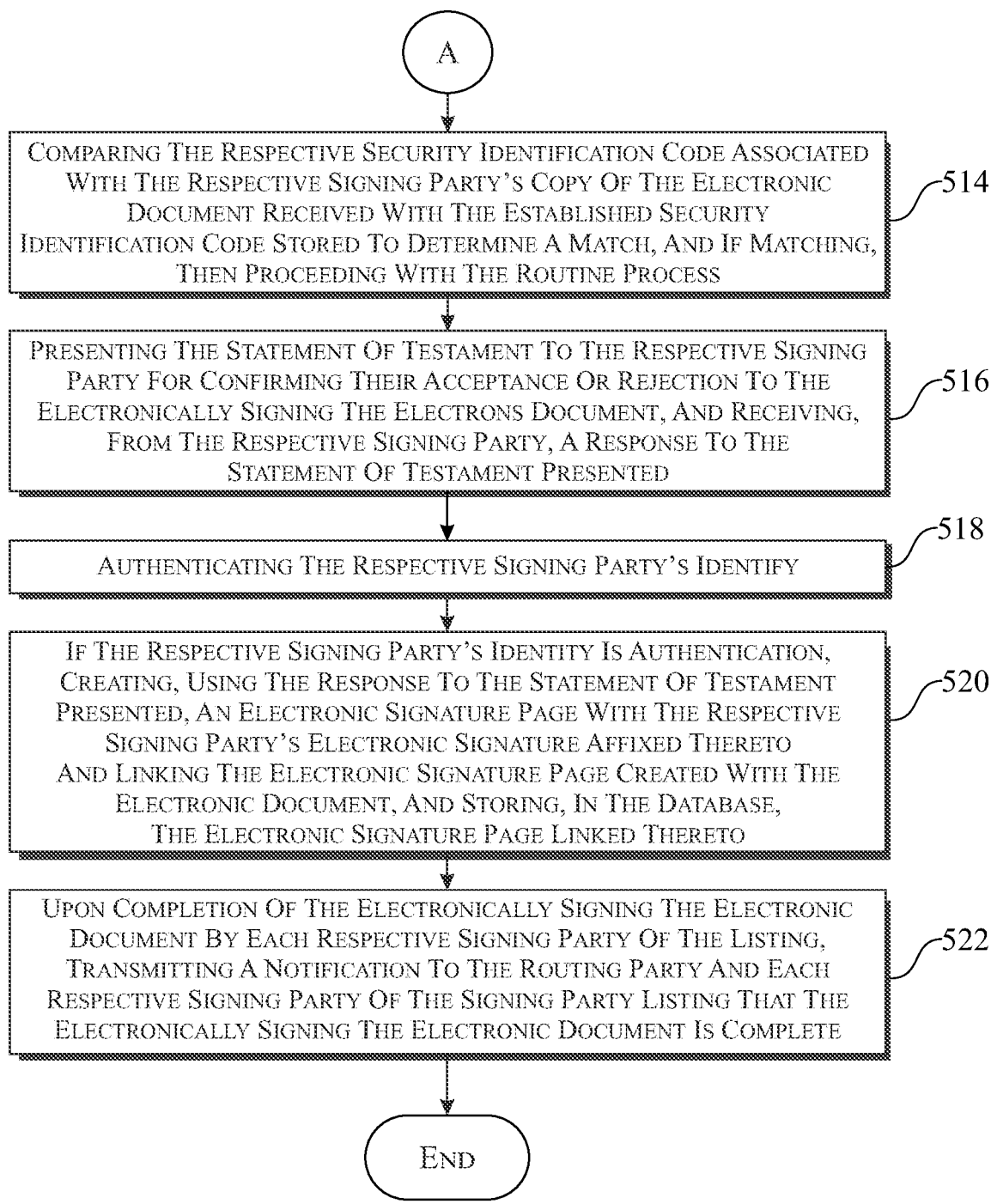

Turning our attention to FIGS. 5A and 5B, a flowchart of illustrative operations 500 are shown a method for managing an electronic signature utility system and for electronically signing an electronic document. As noted above, the principles of the disclosed embodiments are equally applicable to any type of electronic document or file. As shown, the operations 500 comprising, at step 502, receiving, from a routing party, a first copy of the electronic document and a routing process specific to the electronically signing the electronic document, the routing process defining details associated with the electronically signing of the electronic document comprising at least a signing party listing and a statement of testament. Then, at step 504, establishing, using the first copy of the electronic document received, a security identification code specific to the electronic document, and the first copy of the electronic document and for all respective other copies of the electronic document in the possession of each respective signing party of the signing party listing, and storing, in the database, the security identification code established but not the first copy of the electronic document received or any one of the respective other copies of the electronic document in possession of each respective party of the signing party listing, at step 506. Further, at steps 508 through 520: for each respective signing party of the signing party listing: sending, at step 510, a notification inviting the respective signing party to join the routing process by providing, to the electronic signature utility system, the respective signing party's copy of the electronic document. At step 512, receiving, from the respective signing party, the respective signing party's copy of the electronic document, and at step 514, comparing the respective security identification code associated with the respective signing party's copy of the electronic document received with the established security identification code stored to determine a match, and if matching, then proceeding with the routing process. Then, at step 516, presenting the statement of testament to the respective signing party for confirming their acceptance or rejection to the electronically signing the electronic document, and receiving, from the respective signing party, a response to the statement of testament presented. At step 518, authenticating the respective signing party's identity, at step 520, if the respective signing party's identity is authenticated, creating, using the response to the statement of testament presented, an electronic signature page with the respective signing party's electronic signature affixed thereto and linking the electronic signature page created with the electronic document, and storing, in the database, the electronic signature page linked thereto. Then, at step 522, upon completion of the electronically signing the electronic document by each respective signing party of the signing party listing, transmitting a notification to the routing party and each respective signing party of the signing party listing that the electronically signing the electronic document is complete.

In this way, users may approve, decline, acknowledge, consent, certify and/or electronically execute any electronic document in a fully secure fashion and in compliance with applicable electronic signature laws. As noted previously, the electronic signature utility system and method of the disclosed embodiments provides an advantageous improvement of at least one practical application, i.e., the execution and management of electronic documents in that the underlying document for execution is not retained in storage and/or not modified in any way. This solves a security problem and increases the security of the user's files in that such files remain private. This decreases the potential for third party hacking, for example, and risk to such user files. Importantly, in accordance with the principles of the disclosed embodiments, the electronic execution of a file (e.g., a negotiated contract between two parties) is carried out without requiring the modification or storage, by the electronic signature utility system here under, of the underlying file by and through the linkage of authenticated electronic signatures to the underlying file of the parties required to execute such file.

Figure 6:
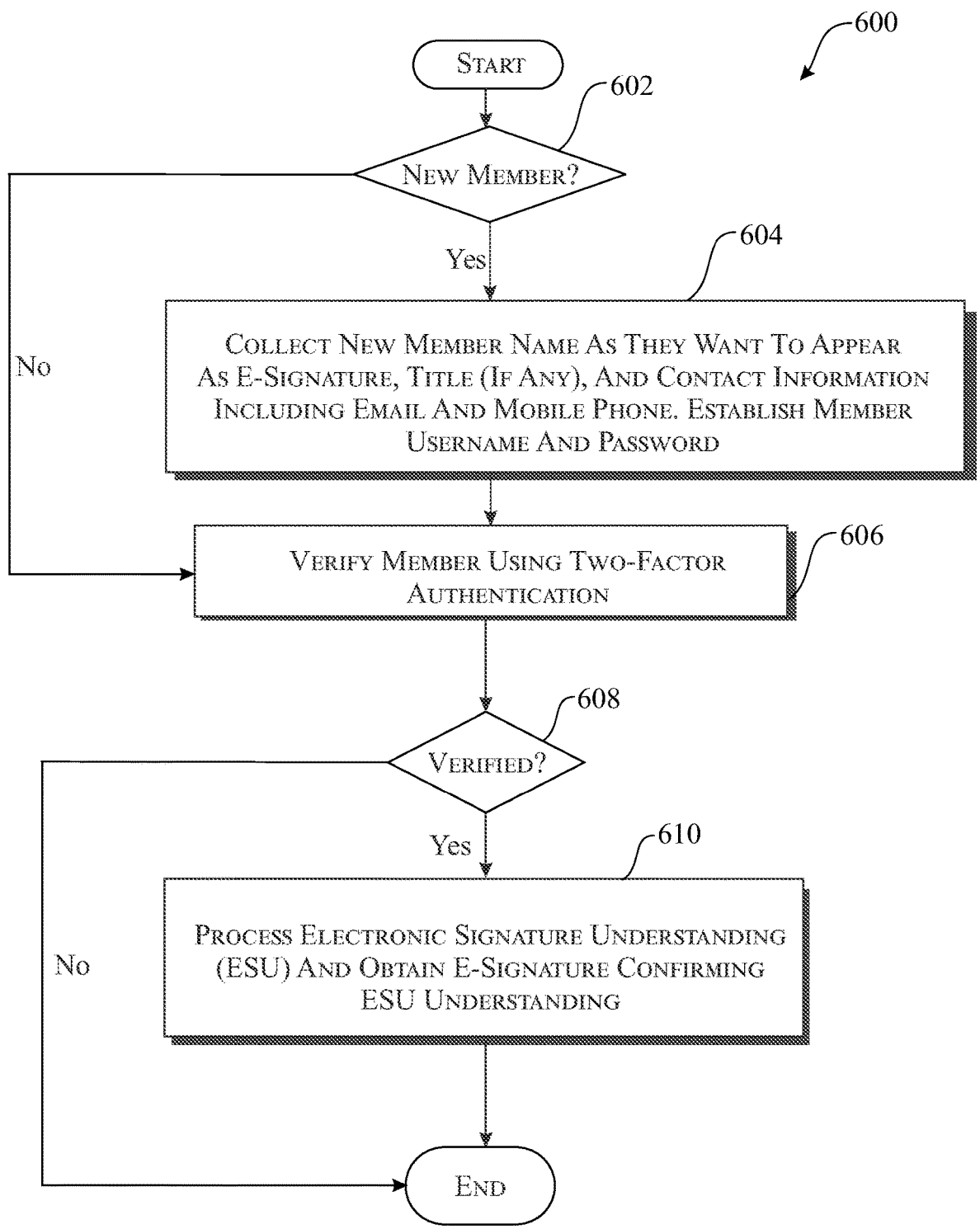
FIG. 6 presents a flowchart of illustrative operations for registering new member(s) for use of and access to the electronic signature utility system of FIG. 2 in accordance with an embodiment.

As detailed above with respect to at least FIGS. 5A-B, the disclosed embodiments involve a series of operations carried out by and through, illustratively, the electronic signature utility system 200 including, but not limited, operations directed to registration, routing, electronic signature execution, verification, route status and document status. Such operations will now be further discussed and expanded upon in furtherance of the foregoing details thereof. Turning our attention to FIG. 6, a flowchart of illustrative operations 600 is presented for registering new member(s) for use of and access to the electronic signature utility system of FIG. 2 in accordance with an embodiment and as described herein above with respect to the operations of FIGS. 5A-5B. To be clear, the operations shown in FIG. 6 are focused on new member registration and/or an existing member that has forgotten their password and is otherwise locked out of the system and needs to re-establish a password (i.e., treated as a "new member" for purposes of the FIG. 6 operations). An existing member who knows their password will enter their password and log-in into the system is a customary fashion. At step 602, a determination is made if the member is a new or existing member and, if a new member then, at step 604 a variety of information is collected such as the member's name and how they wish their name to appear as their e-signature, the member's title (if any), and contact information for the member including, but not limited to, their electronic mail address and mobile telephone number. The mobile telephone number is particularly important given that two-factor authorization may be employed for member verification purposes, as further detailed herein below. At step 606, the member's identity is verified using, illustratively, two-factor authentication that involves the member providing their password and the electronic signature utility system 200 then sending a unique authorization code to the member's electronic mail address and/or their mobile telephone. At step 608, a determination is made whether the information provided by the member confirms their identify, and if not, then the operations end. If the member identify is successfully verified then, at step 610, an electronic signature understanding (ESU) is presented for review by the member (e.g., as required by 21 CFR Part 11) and the member must confirm their affirmation with their electronic signature in accordance with the above-detailed operations. Once such affirmation is received, the registration is complete.

Figure 7:
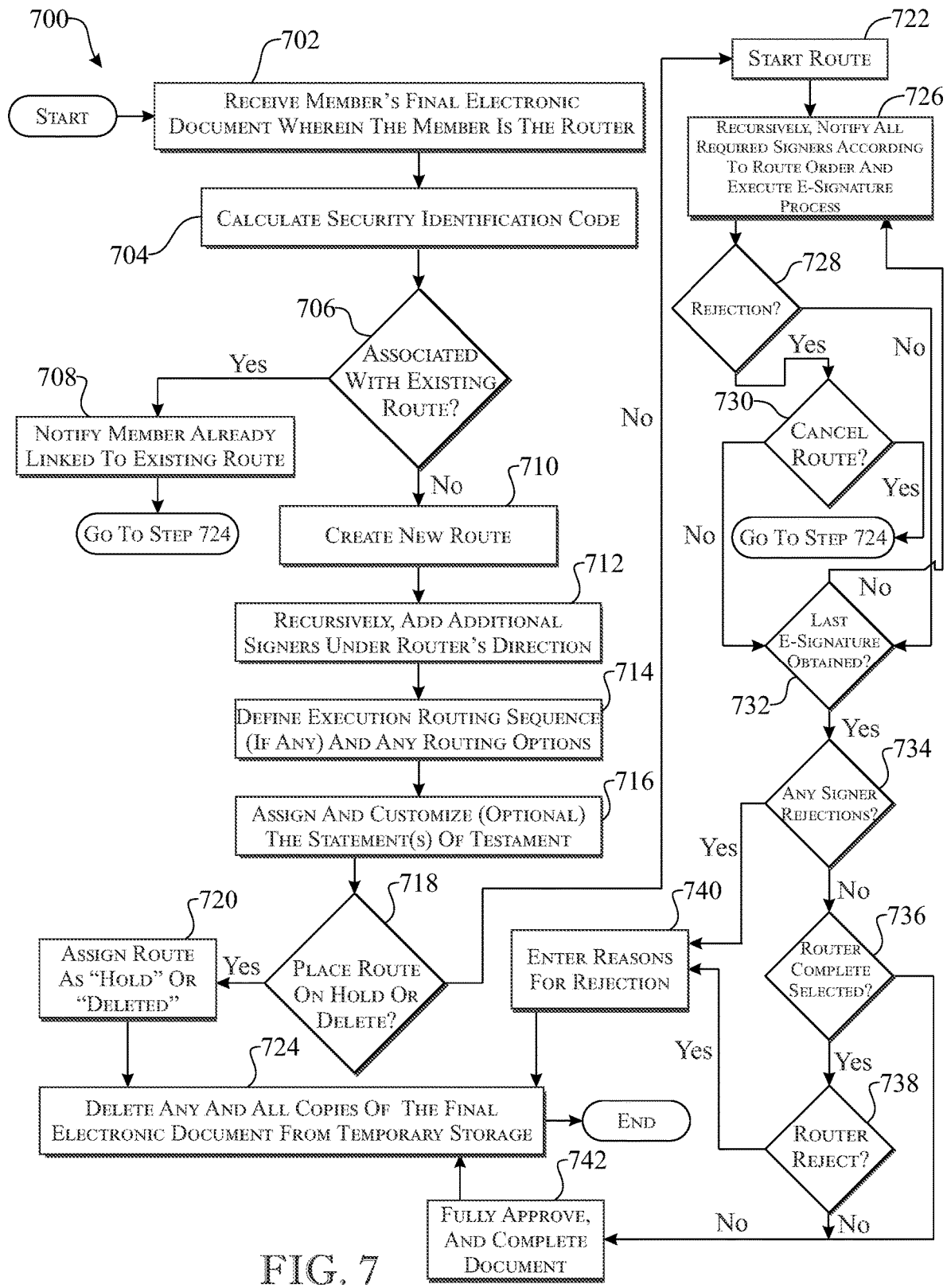
FIG. 7 presents a flowchart of illustrative operations for the routing process of the electronic signature utility system of FIG. 2 in accordance with an embodiment.

Turning our attention to FIG. 7, a flowchart of illustrative operations 700 is presented for the routing process of the electronic signature utility system of FIG. 2 in accordance with an embodiment and as described herein above with respect to the operations of FIGS. 5A-B. At step 702, there is a receiving, from a routing party (i.e., the router), the router's copy (i.e., a first copy of the electronic document). Notably, for purposes of the instant embodiment, the individual must be a member in order to proceed as a router party in accordance with the operations. Also, as noted previously, a router may or may not also be a signer depending upon the embodiment. It will be noted that, consistent with the principles of the embodiments hereunder, that prior to initiating the routing process a member (whether a router and/or signer) will have a respective copy of the final electronic document that needs to be electronically signed that they are storing locally. Illustratively, that final electronic document should be in an un-editable form (such as a locked file or a PDF). In certain instances, the member/router may convert a file from a first format (e.g., a Word file) to a second format (e g., a PDF file). At step 704, using the received final electronic document as uploaded by the routing party, the security identification code is calculated. In an embodiment, the security identify code is a checksum as calculated from the file. As will be readily understood, a checksum is a sequence of numbers and letters used to check data for errors. As such, a checksum is a small-sized block of data derived from another block of digital data for the purpose of detecting errors that may have been introduced during transmission or storage, for example. Further, if you know the checksum of an original file, you can use a checksum utility to confirm your copy is identical (or whether another party's copy is identical). Typical algorithms used for such checksum calculations include MD5, SHA-1, SHA-256, and SHA-512 While checksums are detailed herein it will be understood that any form of security identification code may be used that provides for the confirmation that an electronic document is an exact copy of the original electronic document from which it was derived. At step 706, a determination is made as to whether the calculated security identification code (e.g, a checksum) is associated with any existing route. If so, then a notification is made, at step 708, that the final electronic document is already linked to another member's route, and the operations move to step 724 for the deleting of any and all copies of the final electronic document from temporary storage (e.g., the temporary storage of the electronic signature utility system 200). As noted above, this is an important feature of the principles of the disclosed embodiments as this enhances the security of the overall operations and system. At step 710 a new route is created. At step 712, additional signers are recursively added under the direction of the router and at step 714 the router is able to define any execution sequence and/or add additional signers, for example. At step 716, the router assigns the Statement(s) of Testament that the signers will choose in their execution process. By default, these are defined as "I Accept" and "I Reject" but the router may change these attestations to anything they choose and/or provided additional statements. At step 718, the router may place the route on hold or delete the route and, if so, at step 720 the appropriate designation is assigned (i.e., "hold" or "deleted) and the operations move to step 724 for the deleting of any and all copies of the final electronic document from temporary storage (e.g., the temporary storage of the electronic signature utility system 200) before ending all operations.

Otherwise, at step 722, the route is started. At step 726, all required signers are notified, on a recursive basis, according to the route order and each signer electronically signs the document with the e-signature signifying either their acceptance or rejection. To be clear, each signer is required to electronically sign the document whether they have chosen to accept or reject the terms as designated by their response to the statement of testament presented. At step 728, a determination is made if the signer has rejected and if so, at step 730 a determination is made as to whether the router has set the option to automatically cancel any route upon any rejection. If true, the operations move to step 724 for the deleting of any and all copies of the final electronic document from temporary storage (e.g., the temporary storage of the electronic signature utility system 200) before ending all operations. If not, then the e-signature operations continue, and at step 732, a determination is made as to whether the last required e-signature has been obtained. If so, at step 734, a determination is made if there was any signer rejection(s) and if so, the operations move to step 724 for the deleting of any and all copies of the final electronic document from temporary storage (e.g., the temporary storage of the electronic signature utility system 200) before ending all operations. Otherwise, at step 736, a determination is made if the selection was made that the router is to complete the document and execution process. If not, the execution of the final electronic document is, at step 742, fully approved and the document completed and, the operations move to step 724 for the deleting of any and all copies of the final electronic document from temporary storage (e.g., the temporary storage of the electronic signature utility system 200) before ending all operations. If the router complete option is selected, then a determination is made, at step 738, whether the router has rejected and if so, at step 740, the router is required to enter their reasons for rejection. Once these rejection reasons are obtained, the operations move to step 724 for the deleting of any and all copies of the final electronic document from temporary storage (e.g., the temporary storage of the electronic signature utility system 200) before ending all operations. If the router does not enter a rejection, the execution of the final electronic document is, as step 742, fully approved and the document completed and, the operations move to step 724 for the deleting of any and all copies of the final electronic document from temporary storage (e.g, the temporary storage of the electronic signature utility system 200) before ending all operations.

Figure 8:
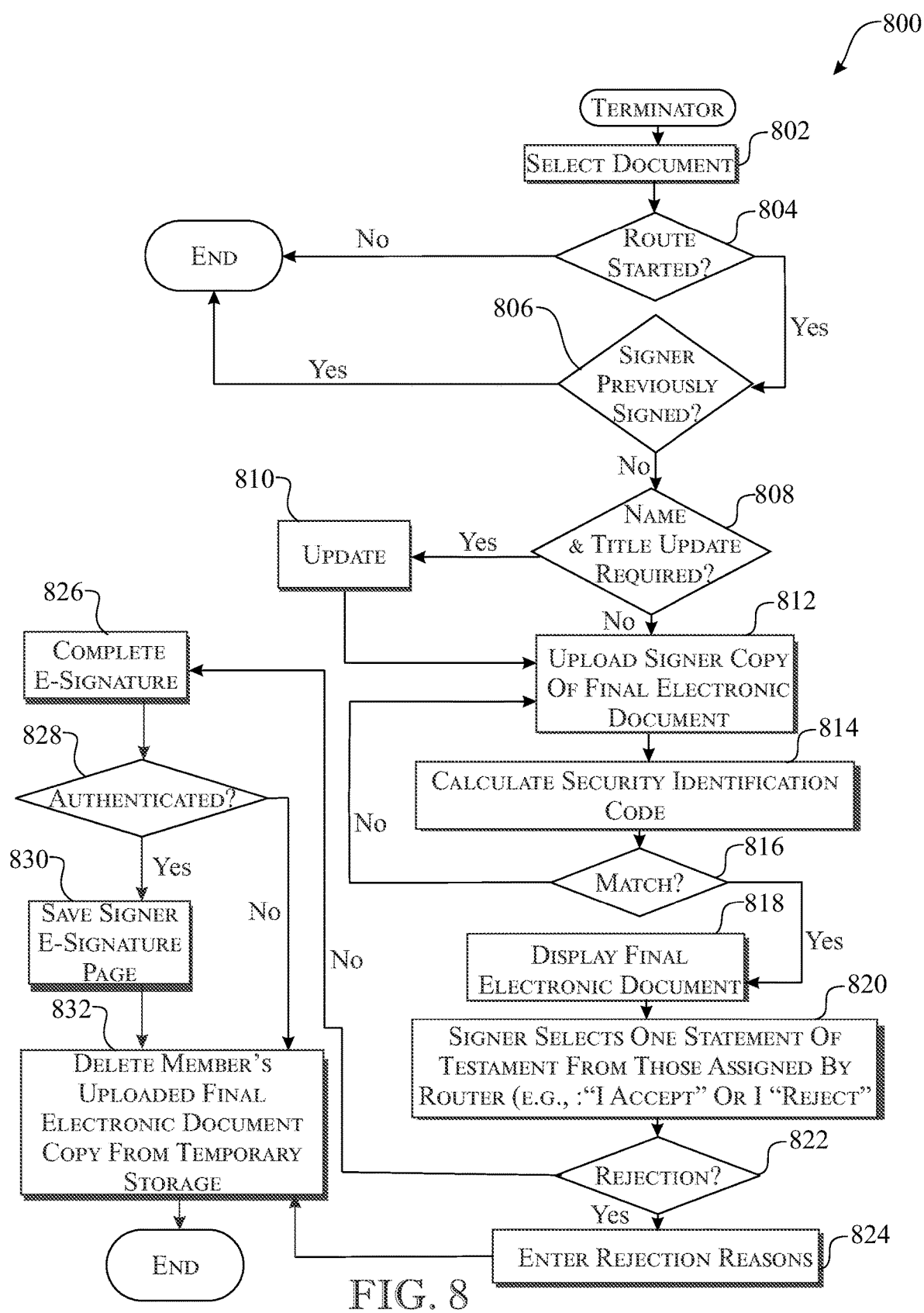
FIG. 8 presents a flowchart of illustrative operations for the electronic signature process of the electronic signature utility system of FIG. 2 in accordance with an embodiment.

Turning our attention to FIG. 8, a flowchart of illustrative operations 800 is presented for the electronic signature process of the electronic signature utility system 200 of FIG. 2 in accordance with an embodiment. It will be noted that prior to beginning any routing process, the router and/or signers will have a final electronic document that needs to be electronically signed. If that file is a traditional word processing file (e.g., a Microsoft Word file format) then such file will be typically converted into an un-editable form (e.g, a PDF file). In accordance with the principles of the disclosed embodiments, each signer of any such document must have an exact copy that is confirmed by the electronic signature utility system 200 before allowing any signer to execute. As shown in FIG. 8, at step 802 the final electronic document is selected (e.g., by a particular signer) and a determination is made, at step 804, as to whether the router has actually started and engaged the applicable route for the electronic signing of the document. If not, the operations end. If so, a determination is made, at step 806, as to whether the current signer has previously applied their e-signature for this final electronic document. If so, the operations end. If not, a check is made, at step 808, as to whether this member/signer had previously registered after the route was created and, if so, their name and/or title may be updated, at step 810. Then, at step 812, the signer uploads their respective copy if the final electronic document and a determination is made, at steps 814 and 816, by calculating the security identification code, and if there is a match between the security identification code associated with signer's uploaded file and the security identification code associated with route. If not matching, the operations return to the upload operation at step 812 to allow the signer to re-try uploading their file copy. If matching, the final electronic document is displayed, at step 818, and the signer selects, as step 820, one Statement of Testament from those assigned by the router (e.g, "I accept" or "I reject"). A determination is made, as step 822, whether the signer has rejected signing and, if so, then they are required to enter reasons for such rejection, at step 824 and the operations move to step 832 for the deleting of any and all copies of the final electronic document from temporary storage (e.g., the temporary storage of the electronic signature utility system 200) before ending all operations. If not rejected, then the signer completes, at step 826, their electronic signing by, illustratively, entering their password for completing the e-signature in accordance with the electronic signature they executed during the registration process, as detailed herein. If the password is authenticated, at step 828, then the signer's electronic signature page is completed and saved, at step 830. At step 832, the signers/member's uploaded final electronic document is deleted from the temporary storage of the electronic signature utility system 200 and the e-signature operations end.

Figure 9:
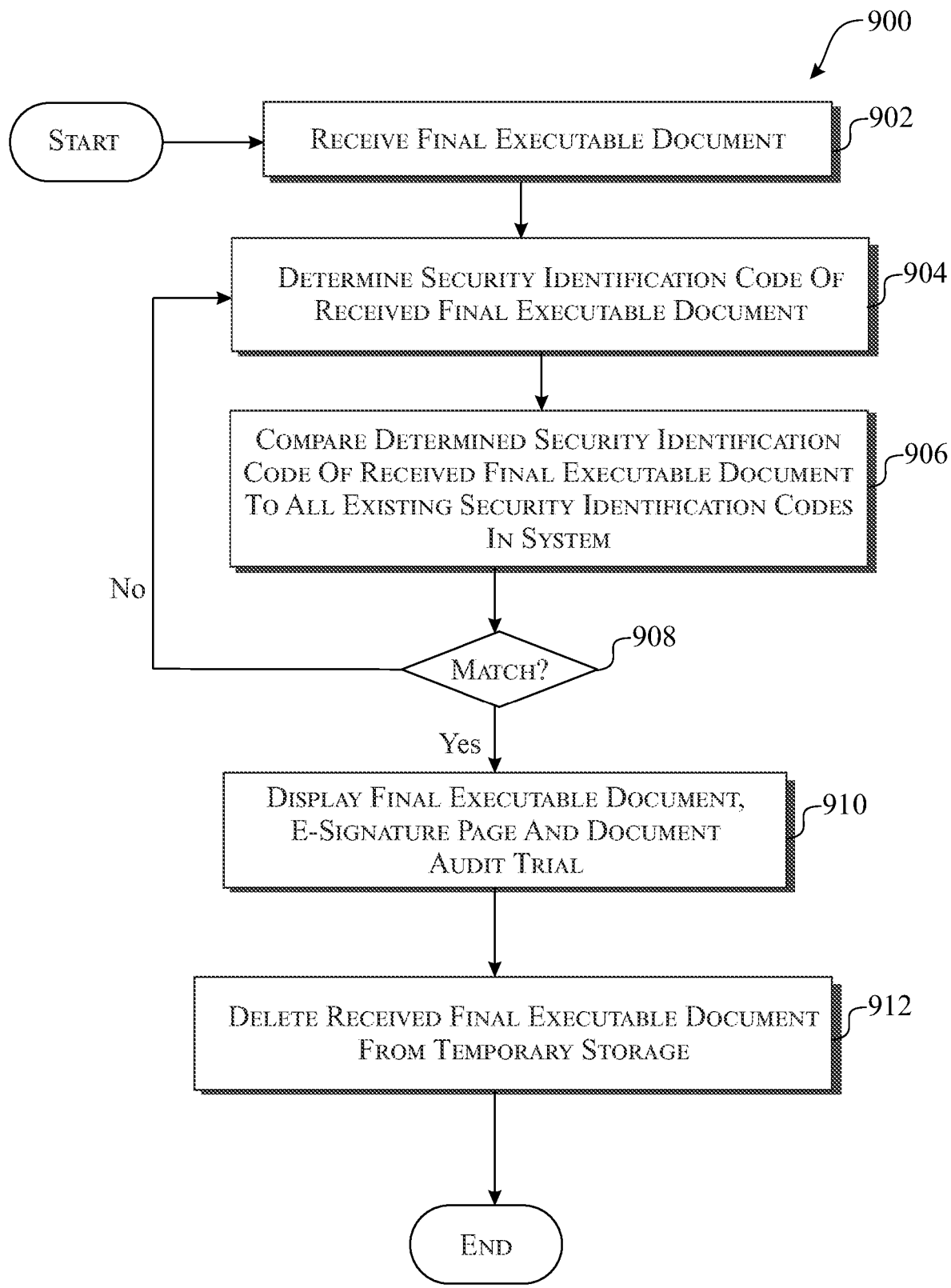
FIG. 9 presents a flowchart of illustrative operations for the verification process of the electronic signature utility system of FIG. 2 in accordance with an embodiment.

FIG. 9 presents a flowchart of illustrative operations 900 for the verification process of the electronic signature utility system 200 of FIG. 2 in accordance with an embodiment. In accordance with the principles of the disclosed embodiments, when the router initially sets up the routing process for the electronic signing of a particular document, the final electronic document is uploaded, and the associated security identification code determined for such file. In this way, this establishes the associated security identification code as an execution key useful in a locking of the route and if/when a signer later uploads their respective copy of the final electronic document then the route may be unlocked by the system upon determining that the security identification codes are matching. As such, at step 902, the final executable document is received (i.e., uploaded) from the signer/member and the security identification is code is determined, at step 904, and the aforementioned comparison between the respective security identification codes is made, at step 906. If not matching, at step 908, then the operations return to step 904. If matching, then the final executable document is displayed, at step 910, together with the e-signature page and any document audit trail. Then, at step 912, the received/uploaded final electronic document is deleted from the temporary storage of the electronic signature utility system 200 and the verification operations end.

Figure 10:
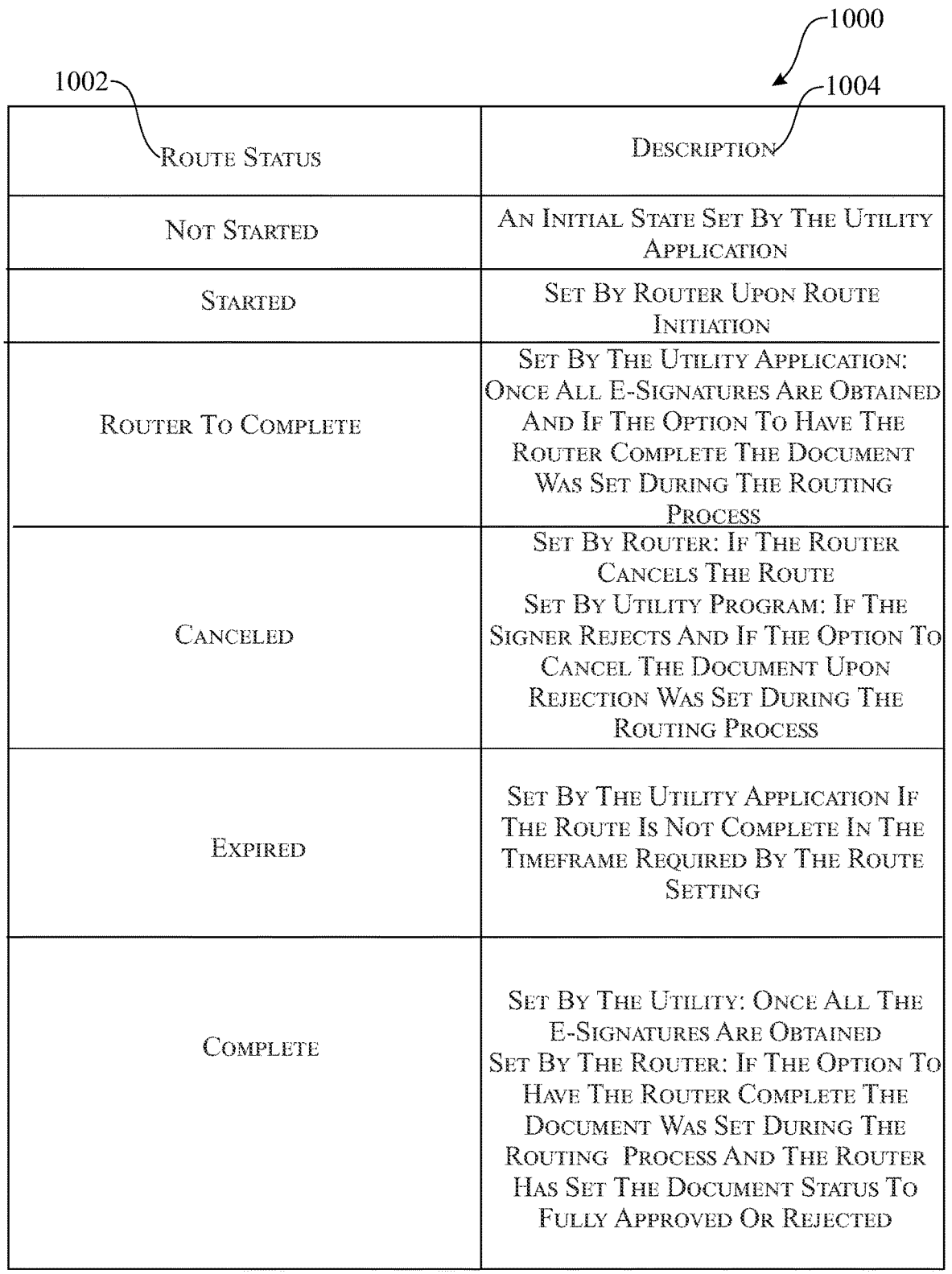
FIG. 10 presents a flowchart of illustrative operations for the route status process of the electronic signature utility system of FIG. 2 in accordance with an embodiment.

Turning our attention to FIG. 10, an illustrative routing process status table 1000 is shown for use with the electronic signature utility system 200 of FIG. 2 in accordance with an embodiment. As shown in FIG. 10, there is a respective route status 1002 with an associated description 1004. For example, when a route is first created, the route status is set to "not started" and then set to "started" upon activation. Further, the "router to complete" route status is used if the option was set, during the routing process, to have the router complete the document when all e-signatures have been obtained from the require signers. A "canceled" route status 1002 is used if the router manually cancels a route or if the electronic signature utility system 200 itself cancels the route. An "expired" route status 1002 is set by the electronic signature utility system 200 if the route is not complete in a timeframe (e.g., ninety (90) days) required by the routing settings. Finally, a "complete" route status 1002 is used once all e-signatures have been obtained and if the option to have the router complete document was set during the routing process and the router has subsequently set the document status to "fully approved" or "rejected. Alternatively, the electronic signature utility system 200 sets the status to "complete" once all e-signatures are obtained.

FIG. 11 shows an illustrative document status table 1100 for use with the electronic signature utility system 200 of FIG. 2 in accordance with an embodiment. As shown in FIG. 11, there is a respective document status 1102 with an associated description 1104. For example, when a route is first created and activated, the document status 1102 is set to "pending" by the electronic signature utility system 200. If a signer rejects a document, the electronic signature utility system 200 used the "rejected" document status 1102 to signify such rejection. Alternatively, if the option to have the router complete document was set during the routing process, then the router can reject the final electronic document and the "rejected" document status 1102 is assigned. Upon receipt of all the required e-signatures for a particular document, the electronic signature utility system 200 will designed a "fully approved" document status 1102. Alternatively, if the option to have the router complete the document was set during the routing process, then the router may fully approve the final electronic document and the "fully approved" document status 1102 is assigned.

As noted above, in some embodiments the method or methods described above may be executed or carried out by a computing system including a tangible computer-readable storage medium, also described herein as a storage machine, that holds machine-readable instructions executable by a logic machine (i.e., a processor or programmable control device) to provide, implement, perform, and/or enact the above-described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI), or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard, or gaming controller. For example, a user input may indicate a request that certain task is to be executed by the computing system, such as requesting the computing system to display any of the above-described information or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Thus, the steps of the disclosed method (see, e.g, FIGS. 5A-5B and 6-9) and the associated discussion herein above can be defined by the computer program instructions stored in a memory and/or data storage device and controlled by a processor executing the computer program instructions. Accordingly, by executing the computer program instructions, the processor executes an algorithm defined by the disclosed method. For example, the computer program instructions can be implemented as computer executable code programmed by one skilled in the art to perform the illustrative operations defined by the disclosed methods. Further, it will be appreciated that any flowcharts, flow diagrams, state transition diagrams, pseudo code, program code and the like represent various processes which may be substantially represented in computer readable medium and so executed by a computer, machine, or processor, whether or not such computer, machine or processor is explicitly shown. One skilled in the art will recognize that an implementation of an actual computer or computer system may have other structures and may contain other components as well, and that a high-level representation of some of the components of such a computer is for illustrative purposes.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An electronic signature utility system for electronically signing an electronic document, the electronic signature utility system comprising: a processor; a database; a memory storing instructions that when executed cause the processor to perform operations comprising:
   receiving, from a routing party, a first copy of the electronic document and a routing process specific to the electronically signing the electronic document, the routing process defining details associated with the electronically signing of the electronic document comprising at least a signing party listing and a statement of testament;
   establishing, using the first copy of the electronic document received, a security identification code specific to the electronic document, and the first copy of the electronic document and for all respective other copies of the electronic document in the possession of each respective signing party of the signing party listing;
   storing, in the database, the security identification code established but not the first copy of the electronic document received or any one of the respective other copies of the electronic document in possession of each respective party of the signing party listing;
   for each respective signing party of the signing party listing:
      sending a notification inviting the respective signing party to join the routing process by providing, to the electronic signature utility system, the respective signing party's copy of the electronic document;
      receiving, from the respective signing party, the respective signing party's copy of the electronic document;
      comparing the respective security identification code associated with the respective signing party's copy of the electronic document received with the established security identification code stored to determine a match, and when matching, then proceeding with the routing process;
      presenting the statement of testament to the respective signing party for confirming their acceptance or rejection to the electronically signing the electronic document, and receiving, from the respective signing party, a response to the statement of testament presented;
      authenticating the respective signing party's identity;
      when the respective signing party's identity is authenticated, creating, using the response to the statement of testament presented, an electronic signature page with the respective signing party's electronic signature af fixed thereto and linking the electronic signature page created with the electronic document, and storing, in the database, the electronic signature page linked thereto; and
   upon completion of the electronically signing the electronic document by each respective signing party of the signing party listing, transmitting a notification to the routing party and each respective signing party of the signing party listing that the electronically signing the electronic document is complete.

2. The electronic signature utility system of claim 1, wherein the security identification code specific to the electronic document is a checksum.

3. The electronic signature utility system of claim 1, wherein the electronic document is derived from any written document type.

4. The electronic signature utility system of claim 1, wherein the electronic document is derived from any photograph type.

5. The electronic signature utility system of claim 1, wherein the operations performed by the processor further comprise: customizing the statement of testament to define a relationship between an electronic signature and the electronic document.

6. The electronic signature utility system of claim 1, wherein the electronically signing the electronic document complies with at least one recognized electronic signature regulation.

7. The electronic signature utility system of claim 6, wherein the at least one recognized electronic signature regulation is Title 21 of the Code of Federal Regulations Part 11: Electronic Records and Signatures, issued 1997, and any revisions thereto.

8. The electronic signature utility system of claim 1 wherein the operations performed by the processor further comprise:
   registering each respective signing party of the signing party listing for electronically signing privileges in the electronic signature utility system.

9. The electronic signature utility system of claim 1, wherein the electronic document is a Portable Document Format (PDF) file.

10. The electronic signature utility system of claim 1, the operations executed by the processor further comprise:
   calculating a checksum as the security identification code specific to the electronic document.

11. The electronic signature utility system of claim 1, wherein the operations performed by the processor further comprise:
   retrieving the respective signing party's electronic signature for affixing to the electronic signature page created.

12. The electronic signature utility system of claim 1, wherein the authenticating the respective signing party's identity comprises a two-factor authentication.

13. The electronic signature utility system of claim 1, wherein the electronic document having been previously convened by the routing party from a first file format to a second file format, and wherein the routing party and each respective signing party of the signing party listing storing, external to the electronic signature utility system, their own respective copy of the electronic document.

14. The electronic signature utility system of claim 1, wherein the operations performed by the processor further comprise:
  deleting, from the electronic signature utility system, any and all copies of the first copy of the electronic document received and the respective copies of the electronic document received from the respective signing parties.

15. An electronic signature utility system for electronically signing an electronic document, the electronic signature utility system comprising: a processor; a database; a memory storing instructions that when executed cause the processor to perform operations comprising:
  receiving, from a routing party, a first copy of the electronic document and a routing process specific to the electronically signing the electronic document, the routing process defining details associated with the electronically signing of the electronic document comprising at least a signing party listing and a statement of testament;
  establishing, using the first copy of the electronic document received, a security identification code specific to the electronic document, and the first copy of the electronic document and for all respective other copies of the electronic document in the possession of each respective signing party of the signing party listing, the security identification established by calculating a checksum therefore;
  storing, in the database, the security identification code established but not the first copy of the electronic document received or any one of the respective other copies of the electronic document in possession of each respective party of the signing party listing;
  for each respective signing party of the signing party listing:
    sending a notification inviting the respective signing party to join the routing process by providing, to the electronic signature utility system, the respective signing party's copy of the electronic document;
    receiving, from the respective signing party, the respective signing party's copy of the electronic document;
    comparing the respective security identification code associated with the respective signing party's copy of the electronic document received with the established security identification code stored to determine a match, and when matching, then proceeding with the routing process and authenticating the respective signing party's identity;
    when the respective signing party's identity is authenticated, presenting the statement of testament to the respective signing party for confirming their acceptance or rejection to the electronically signing the electronic document, and receiving, from the respective signing party, a response to the statement of testament presented;
    responsive to the response to the statement of testament presented, creating an electronic signature page with the respective signing party's electronic signature affixed thereto and linking the electronic signature page created with the electronic document, and storing, in the database, the electronic signature page linked thereto;
  upon completion of the electronically signing the electronic document by each respective signing party of the signing party listing, transmitting a notification to the routing party and each respective signing party of the signing party listing that the electronically signing the electronic document is complete; and
  deleting, from the electronic signature utility system, any and all copies of the first copy of the electronic document received and the respective copies of the electronic document received from the respective signing parties.

16. The electronic signature utility system of claim 15, wherein the operations performed by the processor further comprise:
  customizing the statement of testament to define a relationship between an electronic signature and the electronic document.

17. The electronic signature utility system of claim 15, wherein the electronic document having been previously converted by the routing party from a first file format to a second file format, and wherein the routing party and each respective signing party of the signing party listing storing, external to the electronic signature utility system, their own respective copy of the electronic document.

18. The electronic signature utility system of claim 15, wherein the electronically signing the electronic document complies with Title 21 of the Code of Federal Regulations Part 11: Electronic Records and Signatures, issued 1997, and any revisions thereto.

19. The electronic signature utility system of claim 15, wherein the authenticating the respective signing party's identity comprises a two-factor authentication.

20. An electronic signature utility system for electronically signing an electronic document, the electronic signature utility system comprising: a processor; a database; a memory storing instructions that when executed cause the processor to perform operations comprising:
  receiving, from a routing party, a first copy of the electronic document and a routing process specific to the electronically signing the electronic document, the routing process defining details associated with the electronically signing of the electronic document comprising at least a signing party listing and a statement of testament, the electronic document having been previously converted by the routing party from a first file format to a second file format;
  establishing, using the first copy of the electronic document received, a security identification code specific to the electronic document, and the first copy of the electronic document and for all respective other copies of the electronic document in the possession of each respective signing party of the signing party listing, the security identification established by calculating a checksum therefore;
  storing, in the database, the security identification code established but not the first copy of the electronic document received or any one of the respective other copies of the electronic document in possession of each respective party of the signing party listing;
  for each respective signing party of the signing party listing:

sending a notification inviting the respective signing party to join the routing process by providing, to the electronic signature utility system, the respective signing party's copy of the electronic document;

receiving, from the respective signing party, the respective signing party's copy of the electronic document;

comparing the respective security identification code associated with the respective signing party's copy of the electronic document received with the established security identification code stored to determine a match, and when matching, then proceeding with the routing process and authenticating the respective signing party's identity using a two-factor authentication;

when the respective signing party's identity is authenticated, presenting the statement of testament to the respective signing party for confirming their acceptance or rejection to the electronically signing the electronic document, and receiving, from the respective signing party, a response to the statement of testament presented;

responsive to the response to the statement of testament presented, creating an electronic signature page with the respective signing party's electronic signature affixed thereto and linking the electronic signature page created with the electronic document, and storing, in the database, the electronic signature page linked thereto;

upon completion of the electronically signing the electronic document by each respective signing party of the signing party listing, transmitting a notification to the routing party and each respective signing party of the signing party listing that the electronically signing the electronic document is complete;

deleting, from the electronic signature utility system, any and all copies of the first copy of the electronic document received and the respective copies of the electronic document received from the respective signing parties; and wherein the electronically signing the electronic document complies with Title 21 of the Code of Federal Regulations Part 11: Electronic Records and Signatures, issued 1997, and any revisions thereto.

* * * * *